United States Patent [19]
Glenn

[11] 3,771,465
[45] Nov. 13, 1973

[54] RAILWAY VEHICLE CENTER BEARING
[75] Inventor: Harry D. Glenn, New Albany, Ohio
[73] Assignee: Buckeye Steel Castings Company, Columbus, Ohio
[22] Filed: May 24, 1972
[21] Appl. No.: 256,405

[52] U.S. Cl............. 105/199 C, 105/200, 105/228, 308/137
[51] Int. Cl......... B61f 5/16, B61f 5/18, F16c 17/04
[58] Field of Search................ 105/199 C, 200, 228; 308/137

[56] References Cited
UNITED STATES PATENTS

| | | | |
|---|---|---|---|
| 1,026,945 | 5/1912 | Coleman............................ | 105/200 |
| 2,056,221 | 10/1936 | Wright et al..................... | 105/200 X |
| 2,995,258 | 8/1961 | Lusink et al. ................ | 105/199 C X |
| 3,405,653 | 10/1936 | Cunningham.................... | 308/137 X |
| 3,603,265 | 9/1971 | Barber............................. | 308/137 X |

Primary Examiner—Robert G. Sheridan
Assistant Examiner—Howard Beltran
Attorney—Richard K. Stevens et al.

[57] ABSTRACT

A railway vehicle has a swivel connection between its body bolster and truck bolster which combines a substantially flat bearing surface on the bottom of a center brace, a rimless substantially flat bearing surface on the truck bolster and under the bearing surface of the center brace, a wear resistant disk between the flat surfaces, and a king-pin in a pocket lined with wear resistant bushings. The upstanding rim of the conventional truck center plate and the conventional body center plate projecting downwardly from the center brace are eliminated. A partially tapered king-pin sufficiently strong to prevent substantial relative lateral and longitudinal movement between the bolsters is provided.

5 Claims, 4 Drawing Figures

PATENTED NOV 13 1973

RAILWAY VEHICLE CENTER BEARING

This invention relates generally to railway vehicles and more particularly to a novel center bearing for the vehicle's body bolster and truck bolster assembly.

The conventional center bearing comprises a bowl-like center plate having an upstanding rim on the upper surface of the truck bolster and a body center plate which projects downwardly from a center brace or filler for the vehicle's center sill. A king-pin is housed in aligned pockets in the two center plates to provide a swivel connection therebetween. In such a center bearing assembly the rim of the truck bolster center plate prevents the male member of the center brace from moving laterally or longitudinally thereby securing the two bolsters against substantial displacement from their normal one over the other positions. This rim wears in service and frequently portions of the rim will crack and break off of the truck bolster center plate. That portion of the body center plate which contacts the rim of the truck bolster center plate also wears in service. When these conditions occur, serious maintenance problems result.

It is therefore an object of this invention to provide an improved center bearing for a railway vehicle. Another object of the invention is to provide a body center plate and a truck center plate assembly for a railway vehicle which is more wear resistant than the conventional center plate assembly. Still another object of the invention is to provide a swivel connection between a truck bolster and body bolster in which the rim of the conventional truck bolster is eliminated and lateral and longitudinal movement of the body bolster relative to the truck bolster during service loading is prevented by the king-pin. A more specific object of the invention is to provide a swivel connection between a truck bolster and body bolster having a rimless, flat wear resistant truck center plate, a body center plate, a king-pin adapted to prevent relative lateral or longitudinal movement between the bolsters and wear resistant pockets for the king-pin.

Other objects will become apparent from the following description with reference to the accompanying drawing in which.

Figure 2:
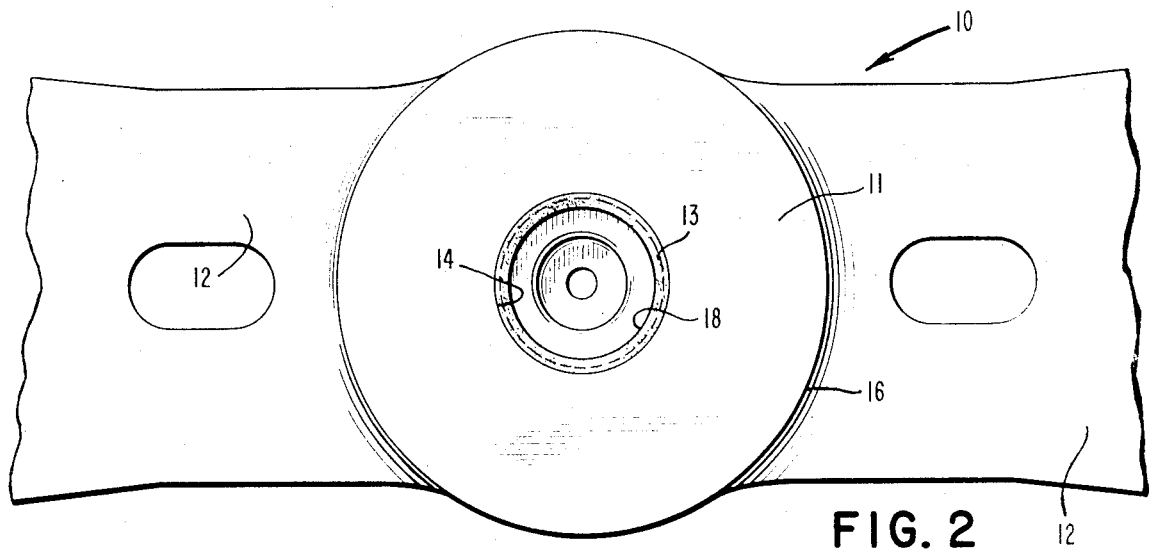
FIG. 2 is a plan view illustrating the top surface of the truck bolster looking down along line 2—2 of FIG. 1.

The foregoing objects and others are accomplished in accordance with this invention, generally speaking, by providing a center bearing for a railway vehicle having a center brace provided with a substantially flat bottom which is the bearing surface for the body bolster, a truck bolster having a rimless, substantially flat bearing surface disposed under the bearing surface of the body bolster, a wear resistant disk separating the flat surfaces, a king-pin, and aligned king-pin pockets in the center brace and truck bolster each having a wear resistant bushing which protects at least those parts of the wall of the pocket which will be struck by the king-pin during relative movement between the bolsters. The pockets in the center brace and the truck bolster have closed ends spaced from the flat surfaces and combine to form a substantially cylindrical pocket which encloses a king-pin. The king-pin is sufficiently strong to prevent relative lateral and longitudinal movement of the bolsters during service loading without shearing. The holes in the center brace and the truck bolster which combine to form the king-pin pocket may be greater in cross-section adjacent their open ends than adjacent their closed end. These areas of greatest cross-section terminate abruptly in shoulders. Wear resistant bushings are disposed in these areas of greatest cross-section with one end against the shoulder and the other end spaced from the open end of the hole. The bushings are fillet welded in place. Of course, if desired, the bushings may line each hole throughout its depth but this is not necessary if the top of the king-pin has a smaller diameter at its upper end than adjacent the center plate bearing surfaces as described in more detail hereinafter.

Referring now to the drawing, a truck bolster 10 has a rimless substantially flat surfaced center plate 11. Center plate 11 is secured to the top webs 12 of the truck bolster 10 and has a closed end hole 14 adapted to receive king-pin 15. Center plate 11 may be an upstanding substantially cylindrical boss 16 on web 12. A perforated disk 17 of wear resistant metal is disposed over center plate 11. The wall of hole 14 is machined to provide an annulus adjacent the open end thereof of greater cross-section than the cross-section adjacent to the closed end. A bushing 18 of wear resistant metal has one end held against shoulder 20 by a fillet weld 13 around the opposite end thereof and adjacent to the open end of hole 14.

Center brace 21 has a king-post 22. A substantially cylindrical bore 24 in king-post 22 terminates at intermediate wall 25. The wall of bore 24 is machined to provide an annulus 60 of greater cross-section adjacent the open end thereof. A bushing 26 of hardened, wear resistant metal is disposed in the annulus 60 with one end held against shoulder 27 by fillet weld 28.

King-pin 15 has an elongated substantially cylindrical base portion 32 in hole 14 which extends upwardly into bore 24 of king-post 22. Hole 14 and bore 24 combine to form a king-pin pocket. The upper end 29 of king-pin 15 is of less cross-section than the base portion 32 so that the upper portion of king-pin 15 is frusto-conically shaped with the base of the frusto-conical portion being integral with the cylindrical portion 32. King-pin 15 is disposed in the pocket with end 29 adjacent to intermediate wall 25. That portion of the king-pin 15 above bushing 26 does not contact the wall of pocket 24 during relative rocking motion between truck bolster 10 and center brace 21 so wear of the pocket wall is only on the bushings.

King-pin 15 may have a lower end 31 of less cross-section than the portion adjacent the open end of hole 14. This configuration may be provided so the king-pin can be used with a conventional truck bolster and clear brake rod holes 51. However, the lower portion of king-pin 15 may be of the same diameter throughout the length of the base portion 32 provided pocket 14 is of similar configuration and suitable holes are provided for the brake rods. That end of king-pin 15 in pocket 24 may have a chamfered edge 50.

The outside diameter of king-pin 15 should be only slightly less than the inside diameter of bushings 18 and 26 to avoid substantial relative lateral and longitudinal movement between the truck and body bolster as the vehicle body rocks and as the vehicle moves over the track. Since the truck center plate is rimless, the king-pin must be sufficiently strong that it alone will prevent relative movement between the bolsters. The king-pin may be made from any shear resistant material and is of larger diameter than the conventional king-pin used with a truck center plate having an upstanding rim. In most embodiments the diameter of the king-pin in the area thereof enclosed by bushings 18 and 26 will be at least about five inches. The king-pin must be capable of preventing horizontal displacement of the body bolster relative to the truck bolster without shearing.

The outside diameter of bushings 18 and 26 should be such that they fit snugly in hole 14 and annulus 60. The inside diameter of the bushings should be such that a clearance of about one-sixteenth to about one-eighth inch is provided around the king-pin.

Figure 1:
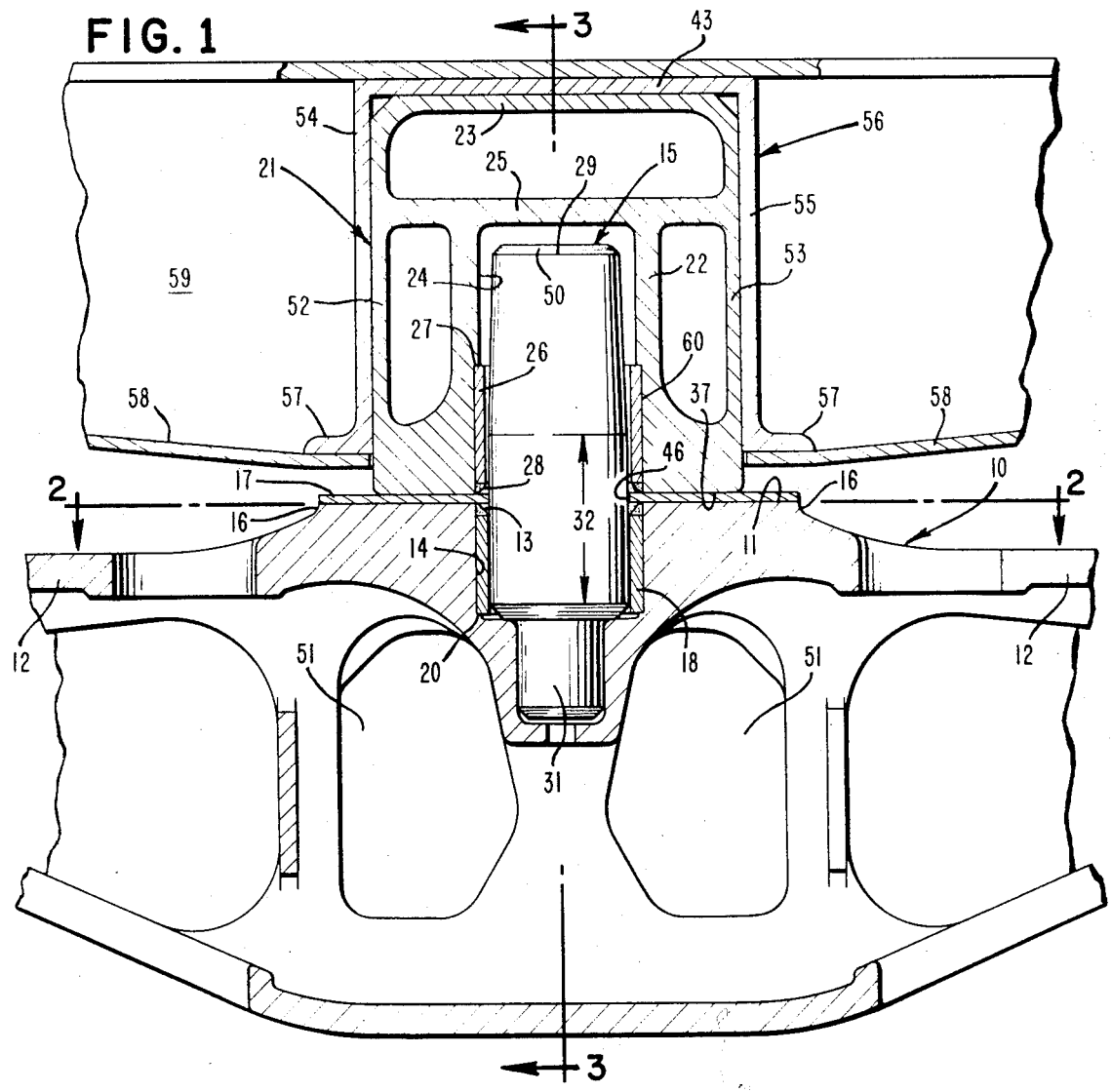
FIG. 1 is a fragmentary section through a truck bolster, a center brace and a center sill provided as one embodiment of the invention.

Returning now to FIG. 1, the side walls 52 and 53 and top wall 23 of center brace 21 lie against the side walls 54 and 55 and top wall 43 of center sill 56. Base flange 57 is secured to the lower web 58 of the body bolster 59.

Figures 3, 4:
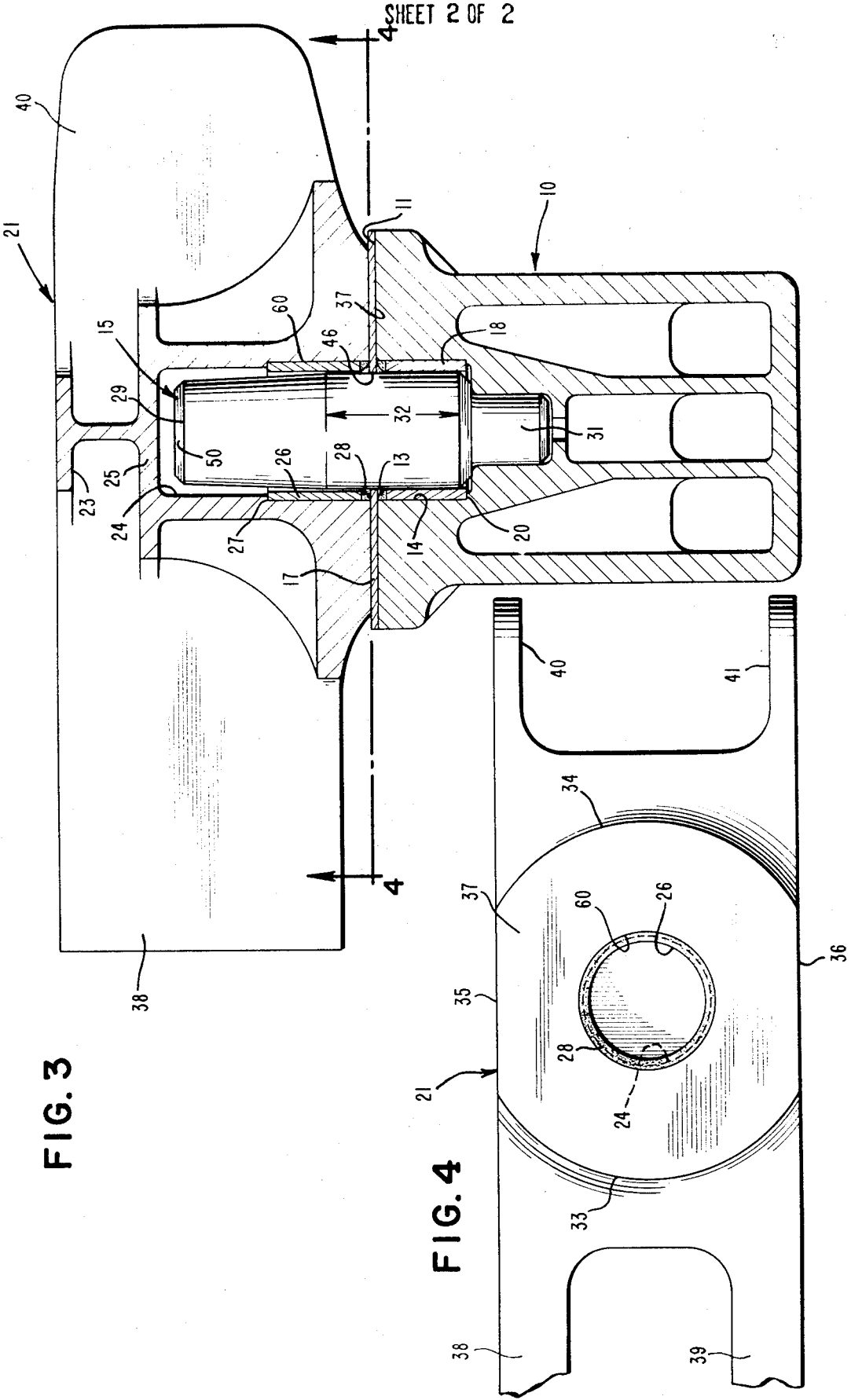
FIG. 3 is a section along the line 3—3 of FIG. 1.
FIG. 4 illustrates the center brace looking upwardly from line 4—4 of FIG. 3.

As shown in FIGS. 3 and 4 the substantially flat bearing surface of body center plate 37 has arcuate shaped longitudinally spaced edges 33 and 34 and substantially straight or flat laterally spaced edges 35 and 36. Center plate 37 is carried by the bottom wall of center brace 21 and rests on wear resistant disk 17. Center brace 21 is integral with rear draft lugs 38 and 39 and inboard extensions 40 and 41.

As shown in FIG. 2 truck center plate 11 is circular in cross-section. Disk 17 may be rectangular but is preferably circular in cross-section and has approximately the same diameter as center plate 11. An opening 46 is provided for king-pin 15. Disk 17 and bushings 18 and 26 may be any high tensile strength steel or other metal which is harder or more wear resistant than AAR Grade B cast steel or other steel used to cast the center brace. Since the upper portion of king-pin 15 is frusto-conical, wear of the king-pin pocket occurs only on the bushings.

In operation as the body bolster rocks on the truck bolster or moves horizontally in relation to the truck bolster, the king-pin absorbs the forces which have heretofore been applied against the rim of the truck center plate. The bushings resist wear from contact with the king-pin but can be easily replaced if wear or other damage should occur.

The novel center bearing provided by this invention has been described as an integral part of a center brace. It is to be understood, however, that the center brace and body center plate may be used as a part of any of various underframe constructions. For example, the center brace and body center plate may be an integral part of a cast underframe end or a part of a draft arm.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. In a railway vehicle, a truck bolster and a center brace carried by a body bolster, said center brace having side walls and a bottom substantially flush with the lower ends of the side walls which provides a substantially flat bearing surface, a rimless, substantially flat bearing surface on said truck bolster disposed under the said bearing surface of the center brace, a wear resistant disk between the said flat surfaces and having a centrally disposed opening therethrough, a king-pin pocket, a king-pin in the pocket which is adapted to prevent substantial relative lateral and longitudinal movement between the bolsters, a first wear resistant bushing lining the wall of the pocket in the center brace and a second wear resistant bushing lining the wall of the pocket in the truck bolster.

2. The vehicle of claim 1 wherein the king-pin has an elongated cylindrical base portion and a frusto-conical upper portion integral therewith, said cylindrical base portion and frusto-conical portions joining each other at a point surrounded by the first bushing.

3. The vehicle of claim 2 wherein the said bearing surface on the truck bolster is an upstanding substantially cylindrical boss on the upper surface of the bolster.

4. The vehicle of claim 3 wherein the bearing surface of the center brace has longitudinally spaced arcuate shaped edges and laterally spaced straight edges substantially flush with the sides of the walls of the center brace.

5. The vehicle of claim 4 wherein that end of the king-pin disposed in the center brace has a chamfered edge.

* * * * *